(12) United States Patent
Pellock et al.

(10) Patent No.: US 11,781,309 B2
(45) Date of Patent: Oct. 10, 2023

(54) BEARING CLIP

(71) Applicant: PT-Enginuity, LLC, Edwardsville, IL (US)

(72) Inventors: Michael Alex Pellock, Edwardsville, IL (US); Herbert Larry Troyer, Greenville, SC (US)

(73) Assignee: PT-Enginuity, LLC, Edwardsville, IL (US)

( * ) Notice: Subject to any disclaimer, the term of this patent is extended or adjusted under 35 U.S.C. 154(b) by 189 days.

(21) Appl. No.: 17/513,635

(22) Filed: Oct. 28, 2021

(65) Prior Publication Data

US 2022/0136230 A1 May 5, 2022

Related U.S. Application Data

(60) Provisional application No. 63/108,963, filed on Nov. 3, 2020.

(51) Int. Cl.
*E04B 1/26* (2006.01)
*F16B 9/00* (2006.01)

(52) U.S. Cl.
CPC .......... *E04B 1/2612* (2013.01); *E04B 1/2608* (2013.01); *F16B 9/052* (2018.08); *E04B 2001/2644* (2013.01); *E04B 2001/2684* (2013.01); *F16B 2200/503* (2018.08)

(58) Field of Classification Search
CPC ................ E04B 1/2612; E04B 1/2608; E04B 2001/2644; E04B 2001/2684; E04B 1/2403; E04B 2001/2415; E04B 2001/5875; F16B 9/052; F16B 2200/503; F16B 5/0614

See application file for complete search history.

(56) References Cited

U.S. PATENT DOCUMENTS

| | | | | |
|---|---|---|---|---|
| 1,830,702 A * | 11/1931 | Johnson | ................ | F16B 9/052 403/190 |
| 2,110,863 A * | 3/1938 | Barnett | ................ | E04B 1/41 52/704 |
| 3,047,110 A * | 7/1962 | Saha | ................ | F16B 7/048 403/189 |
| 4,414,785 A * | 11/1983 | Howell | ................ | E04H 12/22 52/713 |
| 5,027,573 A * | 7/1991 | Commins | ................ | E04B 5/12 52/480 |
| 5,240,342 A * | 8/1993 | Kresa, Jr. | ................ | F16B 9/058 403/403 |
| 5,857,306 A * | 1/1999 | Pellock | ................ | E04B 1/5806 403/231 |
| 5,938,369 A * | 8/1999 | Peters | ................ | E04B 1/2604 52/92.1 |
| 7,913,472 B2 * | 3/2011 | Troth | ................ | E04B 7/063 52/696 |

(Continued)

*Primary Examiner* — Rodney Mintz
(74) *Attorney, Agent, or Firm* — Clements Bernard Walker; Christopher L. Bernard; Christine Wilkes Beninati

(57) ABSTRACT

A bearing clip for joining a truss to a bearing material is disclosed. The bearing clip includes a base portion, a vertical portion, and at least one wing. The base portion includes a back end, sides adjacent to the back end and a bottom surface. The vertical portion extends from the back end of the base portion in a first direction away from the bottom surface. The at least one wing extends from a side of the base portion at an obtuse angle and at least partially in the first direction.

16 Claims, 4 Drawing Sheets

(56) References Cited

U.S. PATENT DOCUMENTS

| | | | |
|---|---|---|---|
| 8,555,580 B2* | 10/2013 | Vilasineekul | E04B 1/2604 |
| | | | 52/696 |
| 9,228,338 B2* | 1/2016 | Lin | E04B 1/2612 |
| 10,227,770 B2* | 3/2019 | Delfeld | E04B 1/40 |
| 10,676,936 B2* | 6/2020 | Lemiegre | E04F 10/00 |
| 11,162,255 B2* | 11/2021 | Wheatley, III | E04H 17/1417 |
| 2009/0113839 A1* | 5/2009 | Carr | E04B 1/2612 |
| | | | 52/712 |
| 2010/0031601 A1* | 2/2010 | Lin | E04B 1/2612 |
| | | | 52/696 |
| 2010/0166497 A1* | 7/2010 | Vilasineekul | E04B 1/2604 |
| | | | 403/205 |
| 2018/0127982 A1* | 5/2018 | Lemiegre | E04F 10/00 |
| 2018/0148920 A1* | 5/2018 | Delfeld | E04B 2/70 |
| 2020/0392720 A1* | 12/2020 | Wheatley, III | E04B 1/2604 |

* cited by examiner

BEARING CLIP

CROSS-REFERENCE TO RELATED APPLICATION

The present disclosure claims the benefit of priority of U.S. Provisional Patent Application 63/108,963, filed on Nov. 3, 2020, and entitled "BEARING CLIP DEVICE," the contents of which are incorporated in full by reference herein.

FIELD OF THE DISCLOSURE

The present disclosure generally relates to a bearing clip. More particularly, the present disclosure relates to a bearing clip for engagement to a bearing material and truss section.

BACKGROUND OF THE DISCLOSURE

Joints between trusses and bearing materials are formed using clips. It is desirable to control a stiffness/rigidity of the clips.

The present background is provided as illustrative environmental context only and should not be construed as being limiting in any manner. It will be readily apparent to those of ordinary skill in the art that the concepts and principles of the present disclosure may be applied in other environmental contexts equally.

BRIEF SUMMARY OF THE DISCLOSURE

The present disclosure provides a bearing clip including a base portion with wings extending from sides thereof at an obtuse angle and a vertical portion that extends upward from a back end thereof. The wings extending at an obtuse angle and along the sides of the base portion provide rigidity to the base portion while also allowing multiple bearing clips to be easily stacked together.

In one illustrative embodiment, the present disclosure provides a bearing clip for joining a truss to a bearing material. The bearing clip includes a base portion, a vertical portion, and at least one wing. The base portion includes a back end, sides adjacent to the back end and a bottom surface. The vertical portion extends from the back end of the base portion in a first direction away from the bottom surface. The at least one wing extends from a side of the base portion at an obtuse angle and at least partially in the first direction.

In another illustrative embodiment, the present disclosure provides a bearing clip. The bearing clip includes a base portion, a vertical portion, and wings. The base portion includes a back end, sides adjacent to the back end, and a bottom surface adapted to engage a bearing material. The vertical portion is adapted to engage a truss and extends substantially parallel from the back end of the base portion away from the bottom surface. The wings extend from each side of the base portion. Each of the wings is positioned along a length of a respective side and extends therefrom at an obtuse angle away from the bottom surface.

In a further illustrative embodiment, the present disclosure provides a truss assembly. The truss assembly includes a bearing clip and a plurality of fasteners. The bearing clip includes a base portion, a vertical portion, and wings. The base portion includes a back end, sides adjacent to the back end, and a bottom surface adapted to engage a bearing material. The vertical portion is adapted to engage a truss and extends substantially parallel from the back end of the base portion away from the bottom surface. The wings extend from each side of the base portion. Each of the wings is positioned along a length of a respective side and extends therefrom at an obtuse angle away from the bottom surface. The plurality of fasteners is adapted to engage the vertical portion to the truss and the base portion to the bearing material.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various embodiments, the present disclosure relates to a bearing clip including a base portion with wings extending from sides thereof at an obtuse angle and a vertical portion that extends upward from a back end thereof. The wings extending at an obtuse angle and along the sides of the base portion provide rigidity to the base portion while also allowing multiple bearing clips to be easily stacked together.

Figure 1:
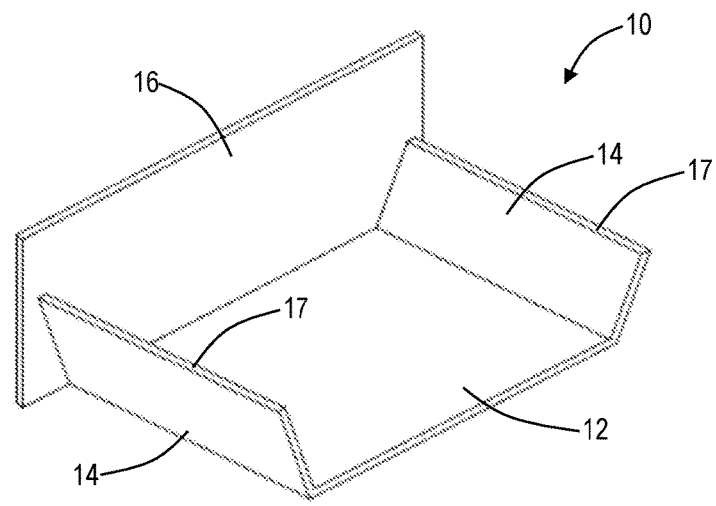
FIG. 1 is a perspective view of one illustrative embodiment of a bearing clip of the present disclosure.
Figure 2:
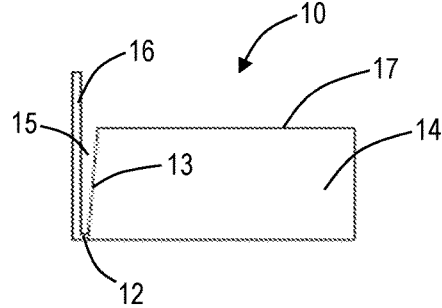
FIG. 2 is a side view of the bearing clip of the illustrative embodiment of FIG. 1.
Figure 3:
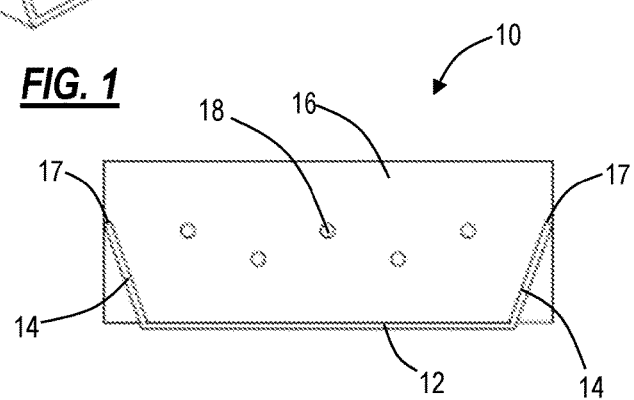
FIG. 3 is a front view of the bearing clip of the illustrative embodiment of FIG. 1.
Figure 4:
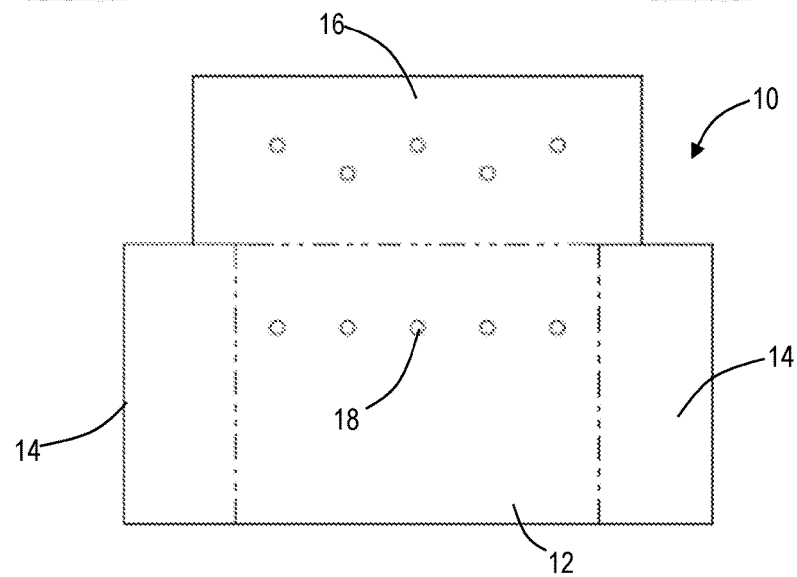
FIG. 4 is a top view of a sheet adapted to form the bearing clip of the illustrative embodiment of FIG. 1.

FIG. 1 is a perspective view of one illustrative embodiment of a bearing clip 10 of the present disclosure. FIG. 2 is a side view of the bearing clip 10 of the illustrative embodiment of FIG. 1. FIG. 3 is a front view of the bearing clip 10 of the illustrative embodiment of FIG. 1. FIG. 4 is a top view of a sheet adapted to form the bearing clip 10 of the illustrative embodiment of FIG. 1. Referring to FIGS. 1-4, in embodiments, the bearing clip 10 includes a base portion 12, a pair of wings 14, and a vertical portion 16. The base portion 12 generally includes a flat plate shape, such as a rectangular shape. The base portion 12 includes a bottom surface adapted to contact/engage a bearing surface and a top portion opposite the bottom portion.

In embodiments, the pair of wings 14 extend upwardly from opposing sides of the base portion 12/flat plate shape, where the upward direction is the direction perpendicular to the top surface away from the bottom surface. In these embodiments, the pair of wings 14 extend upwardly and outwardly (in opposing directions) at an angle with respect to the base portion 12 where outward is a lateral direction parallel to the base portion 12. In embodiments, each of the wings 14 has an angle of inclination with respect to the base portion 12 from 0° to 90°. In some embodiments, each wing 14 forms an obtuse angle with the base portion 12. In some of these embodiments, the angle of inclination is between 20° and 90°, and in further embodiments, the angle of inclination is between 40° and 80°. Each wing 14 includes a top edge 17 distal to the base portion 12. In embodiments, the wings 14 are integrally formed with the base portion 12. The wings 14 extending in such a manner to form an obtuse angle with the base portion 12 allow for multiple bearing clips 10 to easily stack one on top of the other, while increasing a rigidity of the base portion 12. This reduces a space needed for storage and transport of the bearing clips 10.

The vertical portion 16 extends from a back end of the base portion 12, upwardly/transverse to the base portion 12. In embodiments, the vertical portion 16 back end is adjacent to the two sides of the base portion 12 from which the wings 14 extend, the back end extending therebetween. In various embodiments, the vertical portion 16 extends beyond the sides of the base portion 12, and in embodiments, the vertical portion 16 extends further than the top edge 17 of the wings 14, such as in an outward/lateral direction.

In some embodiments, the vertical portion 16 has an angle of inclination with respect to the base portion 12 between 80° and 100°. In some embodiments, the angle of inclination is substantially perpendicular, such as within a predetermined tolerance or between 85° to 95°. As can be seen in FIG. 2, in some embodiments, a back edge 13 of the wings 14 is offset from the back end of the base portion 12/the vertical portion 16 such that there is a gap 15 between each of the wings 14 and the vertical portion 16. In some of these embodiments, the back edge 13 is tapered such that a bottom of the wing 14 is closer to the vertical portion 16 than a top of the wing. With the gap 15 and the taper on the back edge 13, multiple bearing clips 10 can be easily stacked together, even with a vertical portion 16 overlaps laterally with the wings 14.

In embodiments, each of the vertical portion 16 and the base portion 12 include at least one fastening hole 18 adapted to receive a fastener, such as a self-drilling screw. In some embodiments, as illustrated in FIGS. 3 and 4, each of the vertical portion 16 and the base portion 12 includes multiple fastening holes 18.

Referring to FIG. 4, in embodiments, the bearing clip 10 is integrally formed from a single galvanized sheet and the galvanized sheet is cut and bent to form the vertical portion 16 and the wings 14. In other embodiments, one or more of the base portion 12, wings 14, or vertical portion 16 is not integrally formed with the other components and are joined to the other components. In embodiments, the joint is formed by a metallurgical bond, such as a weld, or via a mechanical device, such as fasteners, clips, clamps, and the like. The bearing clip 10 may also be composed of fiberglass, aluminum, or the like.

Figure 5:
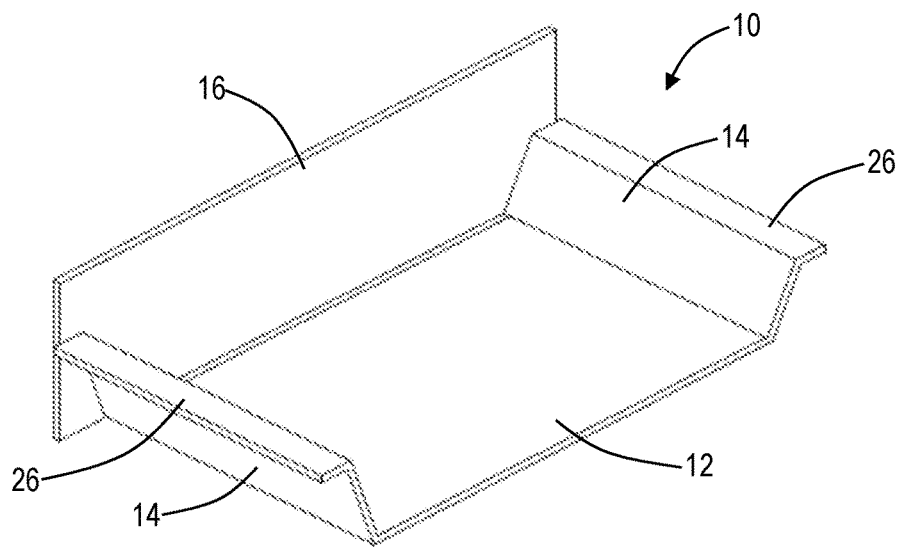
FIG. 5 is a perspective view of one illustrative embodiment of a bearing clip of the present disclosure.
Figures 6, 7:
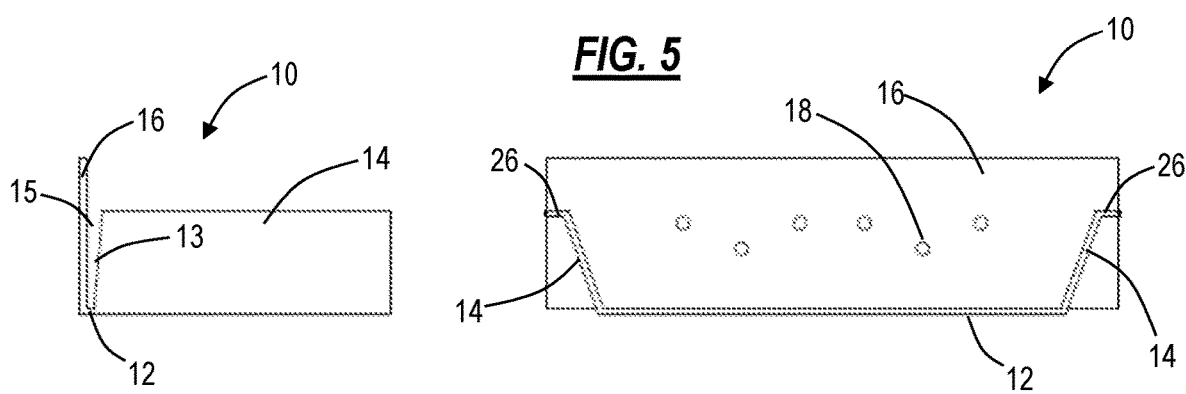
FIG. 6 is a side view of the bearing clip of the illustrative embodiment of FIG. 5.
FIG. 7 is a front view of the bearing clip of the illustrative embodiment of FIG. 5.
Figure 8:
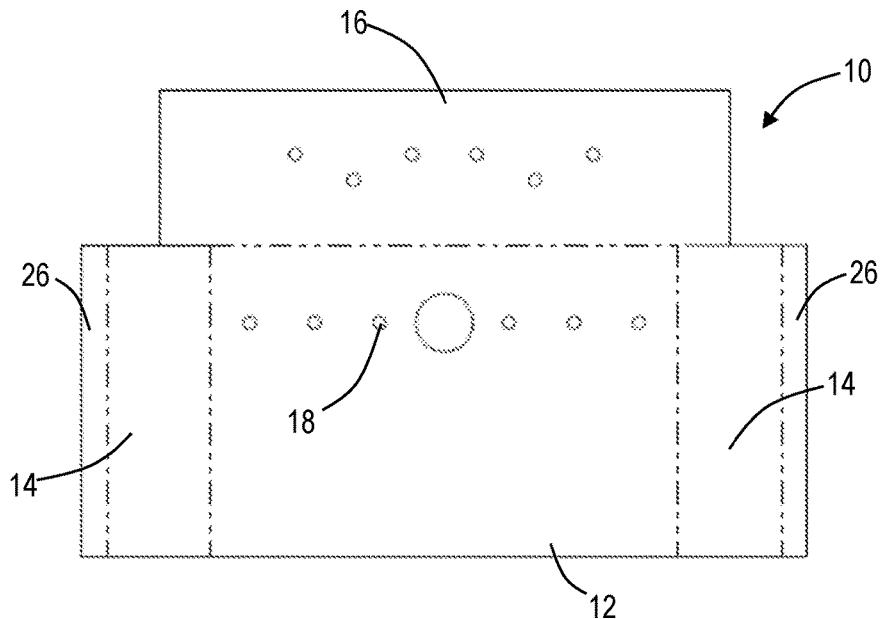
FIG. 8 is a top view of a sheet adapted to form the bearing clip of the illustrative embodiment of FIG. 5.

FIG. 5 is a perspective view of one illustrative embodiment of a bearing clip 10 of the present disclosure. FIG. 6 is a side view of the bearing clip 10 of the illustrative embodiment of FIG. 5. FIG. 7 is a front view of the bearing clip 10 of the illustrative embodiment of FIG. 5. FIG. 8 is a top view of a sheet adapted to form the bearing clip 10 of the illustrative embodiment of FIG. 5. Referring to FIGS. 5-8, in embodiments, the bearing clip 10 includes similar features as described above, and further includes a flange 26 extending from the top edge 17 from each wing 14. In embodiments, each flange 26 extends in the outward/lateral direction and away from the opposing wing 14. In some of these embodiments, the flange 26 extends substantially parallel relative to the base portion 12, such as within a predetermined tolerance or between 85° to 95°.

Referring to FIG. 8, in embodiments and as discussed above with regards to FIG. 4, in various embodiments, the bearing clip 10 is integrally formed from a single galvanized sheet and the galvanized sheet is cut and bent to form the vertical portion 16, the wings 14, and the flanges 26. In other embodiments, one or more of the base portion 12, wings 14, vertical portion 16, and flanges 26 is not integrally formed with the other components and are joined to the other components, such as by welding or connection via a mechanical device including fasteners, clips, clamps, and the like. The bearing clip 10 may also be composed of fiberglass, aluminum, or the like.

Figure 9:
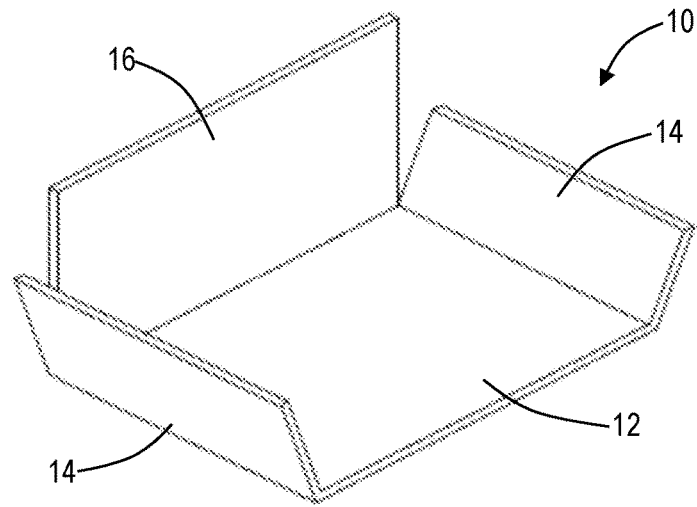
FIG. 9 is a perspective view of one illustrative embodiment of a bearing clip of the present disclosure.
Figure 10:
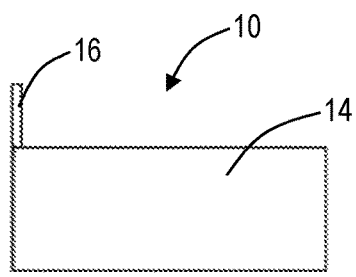
FIG. 10 is a side view of the bearing clip of the illustrative embodiment of FIG. 9.
Figure 11:
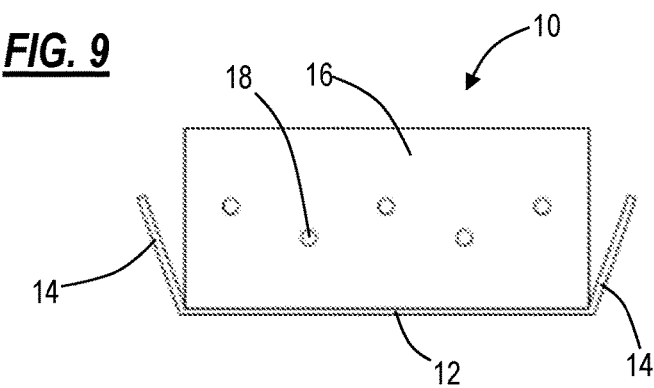
FIG. 11 is a front view of the bearing clip of the illustrative embodiment of FIG. 9.
Figure 12:
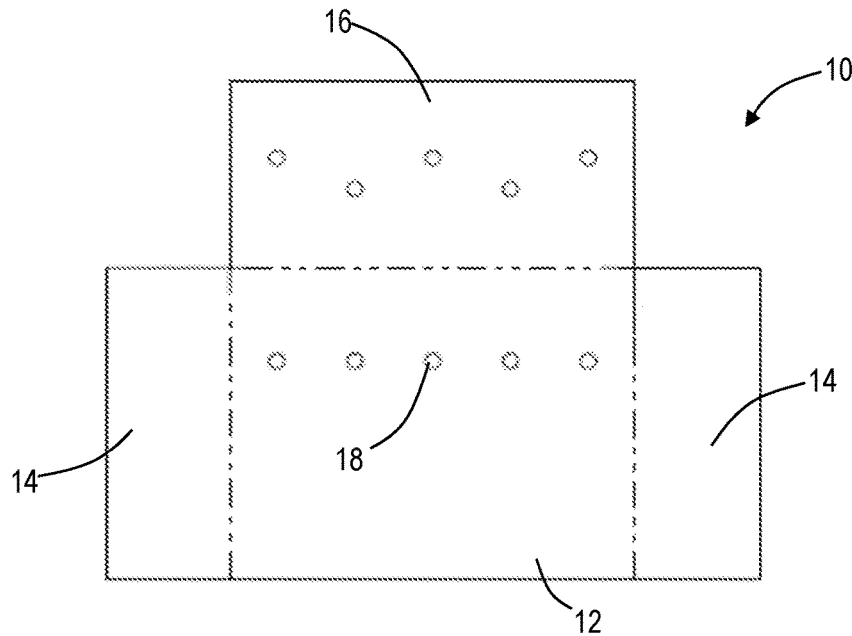
FIG. 12 is a top view of a sheet adapted to form the bearing clip of the illustrative embodiment of FIG. 9.

FIG. 9 is a perspective view of one illustrative embodiment of a bearing clip 10 of the present disclosure. FIG. 10 is a side view of the bearing clip 10 of the illustrative embodiment of FIG. 9. FIG. 11 is a front view of the bearing clip 10 of the illustrative embodiment of FIG. 9. FIG. 12 is a top view of a sheet adapted to form the bearing clip 10 of the illustrative embodiment of FIG. 9. Referring to FIGS. 9-12, in embodiments, each wing 14 extends to the back end of the base portion 12. In these embodiments and in the embodiments disclosed above, the back edge 13 of each wing 14 remains offset from or otherwise out of contact with the adjacent side edge of the vertical portion 16, such that a gap is present therebetween. In some of these embodiments, the back edge 13 of each wing 14 includes the taper as illustrated in FIGS. 1-4.

Figure 13:
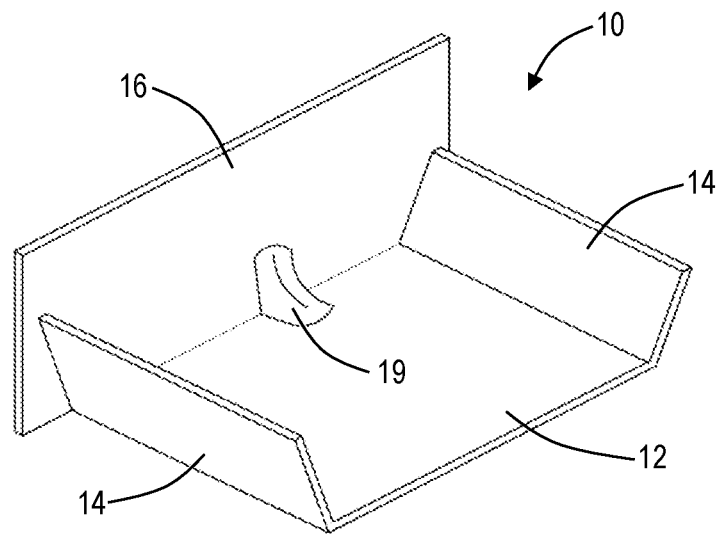
FIG. 13 is a perspective view of one illustrative embodiment of a bearing clip of the present disclosure.

FIG. 13 is a perspective view of one illustrative embodiment of a bearing clip 10 of the present disclosure. Referring to FIG. 13, in embodiments, the bearing clip 10 includes at least one stiffener 19. The stiffener 19 is positioned at a joint between the base portion 12 and the vertical portion 16 (the joint being a bend, a metallurgical bond, and the like). The stiffener 19 extends at least partially along and protrudes from both the base portion 12 and the vertical portion 16. The stiffener 19 is connected to the base portion 12 and the vertical portion 16 along its lengths thereof. In some embodiments, the stiffener 19 is integrally formed from a single material with the base portion 12 and the vertical portion 16. In some embodiments, the stiffener 19 is hollow. In some embodiments, the stiffener 19 is joined to the base portion 12 and the vertical portion 16 via a metallurgical bond, such as a weld. Each of the embodiments disclosed herein can include one or more stiffeners 19.

Figure 14:
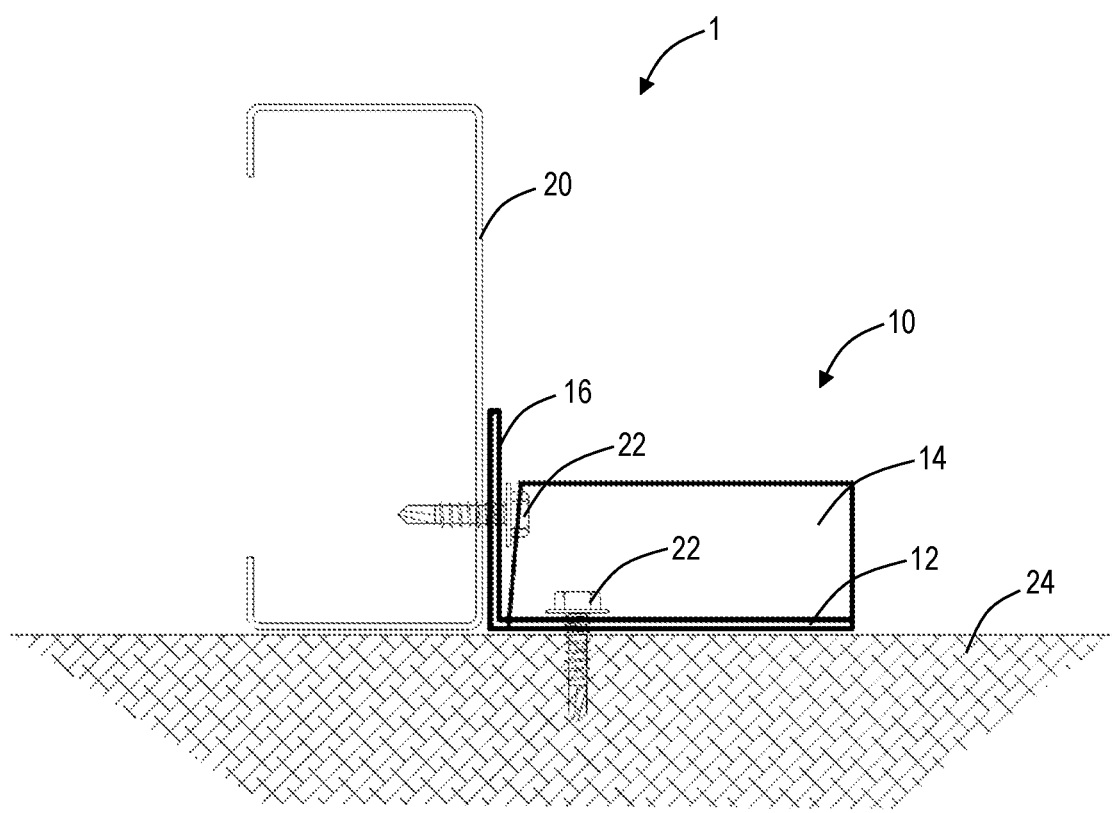
FIG. 14 is a side view of one illustrative embodiment of a truss assembly of the present disclosure.

FIG. 14 is a side view of one illustrative embodiment of a truss assembly 1 of the present disclosure. Referring to FIG. 14, The truss assembly 1 includes a bearing clip 14 and a fasteners 22. The truss assembly 1 can include any embodiment of the bearing clip 14 disclosed herein. The vertical portion 16 is engaged to a truss 20 by the fasteners 22, such as a screws, bolts, and the like. Each fastener 22 extends through a fastening hole 18 within the vertical portion 16 and engages a side of the truss 20, such that the fasteners secure the vertical portion 16 to the truss 20. The base portion 12 is positioned adjacent to a bearing material 24 and is secured thereto via one or more fasteners 22. In embodiments, the bearing material 24 is one of structural steel, an I-beam, a track, studs, concrete, any building materials that form walls of a building, or the like. Each fastener 22 mates with and extends through the base portion 12 and engages the bearing material 24 to secure the base portion 12 to the bearing material 24. In some embodiments, the fasteners 22 for securing the vertical portion 16 to the truss 20 and for securing the base portion 12 to the bearing material 24 are the same, while in other embodiments, the fasteners 22 for securing the base portion 12 to the bearing material 24 are different.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A bearing clip for joining a truss to a bearing material, comprising:
    a base portion including a back end, sides adjacent to the back end and a bottom surface;
    a vertical portion extending from the back end of the base portion in a first direction away from the bottom surface;
    at least one wing extending from a respective said side of the base portion at an obtuse angle and at least partially in the first direction; and
    at least one flange extending outwardly from the at least one wing transverse to the first direction,
    wherein an end of the at least one wing adjacent to the vertical portion is positioned such that there is a gap between the end of the at least one wing and the vertical portion.

2. The bearing clip of claim 1, wherein the at least one wing laterally overlaps with the vertical portion.

3. The bearing clip of claim 1, wherein the end of the at least one wing is laterally offset from the vertical portion such that the gap is at least partially defined thereby.

4. The bearing clip of claim 1, wherein an end of the at least one wing adjacent to the vertical portion includes a taper such that a bottom of the end is closer to the vertical portion than a top of the end.

5. The bearing clip of claim 1, further comprising a stiffener extending at least partially along and protruding from the base portion and the vertical portion.

6. A bearing clip, comprising:
    a base portion including a back end, sides adjacent to the back end, and a bottom surface configured to engage a bearing material;
    a vertical portion configured to engage a truss and extending substantially parallel from the back end of the base portion away from the bottom surface; and
    wings extending from each side of the base portion, each of the wings being positioned along a length of a respective said side and extending therefrom at an obtuse angle away from the bottom surface,
    wherein an end of each of the wings adjacent to the vertical portion is positioned such that there is a gap between the end of each of the wings and the vertical portion.

7. The bearing clip of claim 6, wherein each of the wings laterally overlaps with the vertical portion.

8. The bearing clip of claim 6, wherein the end of each of the wings is laterally offset from the vertical portion such that the gap for the end thereof is laterally offset from the vertical portion such that the gap is at least partially defined thereby.

9. The bearing clip of claim 6, wherein an end of each of the wings adjacent to the vertical portion includes a taper such that a bottom of the end is closer to the vertical portion than a top of the end.

10. The bearing clip of claim 6, further comprising flanges, each of the flanges extending outwardly from a respective said wing.

11. The bearing clip of claim 6, further comprising a stiffener extending at least partially along and protruding from the base portion and the vertical portion.

12. A truss assembly, comprising:
    a bearing clip including
        a base portion including a back end, sides adjacent to the back end and a bottom surface configured to engage a bearing material,
        a vertical portion configured to engage a truss and extending substantially parallel from the back end of the base portion away from the bottom surface, and
        wings extending from each side of the base portion, each of the wings being positioned along a length of a respective said side and extending therefrom at an obtuse angle away from the bottom surface,
        wherein an end of each of the wings adjacent to the vertical portion is positioned such that there is a gap between the end of each of the wings and the vertical portion; and
    a plurality of fasteners configured to engage the vertical portion to the truss and the base portion to the bearing material.

13. The truss assembly of claim 12, wherein each of the wings laterally overlaps with the vertical portion.

14. The truss assembly of claim 12, wherein the end of each of the wings is laterally offset from the vertical portion such that the gap for the end thereof is laterally offset from the vertical portion such that the gap is at least partially defined thereby.

15. The truss assembly of claim 12, wherein the bearing clip further includes flanges, each of the flanges extending outwardly from a respective said wing.

16. The truss assembly of claim 12, wherein the bearing clip further includes a stiffener extending at least partially along and protruding from the base portion and the vertical portion.

* * * * *